United States Patent
Sumiyoshi et al.

(10) Patent No.: US 8,243,199 B2
(45) Date of Patent: Aug. 14, 2012

(54) APPARATUS, METHOD AND PROGRAM FOR ENABLING CONTENT DISPLAYED ON A DISPLAY SCREEN TO BE SWITCHED

(75) Inventors: Kazuhito Sumiyoshi, Tokyo (JP); Takehisa Souraku, Kanagawa (JP)

(73) Assignee: Sony Corporation (JP)

( * ) Notice: Subject to any disclaimer, the term of this patent is extended or adjusted under 35 U.S.C. 154(b) by 816 days.

(21) Appl. No.: 12/378,018

(22) Filed: Feb. 9, 2009

(65) Prior Publication Data

US 2009/0251611 A1 Oct. 8, 2009

(30) Foreign Application Priority Data

Feb. 12, 2008 (JP) ................. P2008-030601

(51) Int. Cl.
*H04N 5/445* (2006.01)
*H04N 9/76* (2006.01)

(52) U.S. Cl. ........................... 348/595; 348/564

(58) Field of Classification Search .............. 348/595, 348/565, 564, 569, 578; 345/639, 640; 715/788, 715/790, 821, 726; 725/37–40, 59–61
See application file for complete search history.

(56) References Cited

U.S. PATENT DOCUMENTS

| | | | | |
|---|---|---|---|---|
| 3,936,868 A * | 2/1976 | Thorpe | ........................ | 348/589 |
| 4,868,660 A * | 9/1989 | Rufray | .......................... | 348/706 |
| 6,016,144 A * | 1/2000 | Blonstein et al. | ............ | 715/791 |
| 6,304,852 B1 * | 10/2001 | Loncteaux | ................. | 705/14.68 |
| 7,034,863 B2 * | 4/2006 | Dieterich et al. | ............. | 348/184 |
| 7,053,964 B2 * | 5/2006 | Moon | .......................... | 348/731 |
| 7,237,251 B1 * | 6/2007 | Oz et al. | ......................... | 725/40 |
| 2005/0166257 A1 * | 7/2005 | Feinleib et al. | ............... | 725/136 |
| 2006/0101488 A1 | 5/2006 | Cho | | |
| 2006/0129908 A1 * | 6/2006 | Markel | ...................... | 715/500.1 |
| 2008/0072132 A1 * | 3/2008 | Moraveji et al. | .............. | 715/203 |

FOREIGN PATENT DOCUMENTS

| | | |
|---|---|---|
| JP | 11-225297 A | 8/1999 |
| JP | 2001-339663 A | 12/2001 |
| JP | 2004-235847 A | 8/2004 |
| JP | 2005-094451 A | 4/2005 |
| JP | 2006-141030 A | 6/2006 |
| JP | 2006-197492 A | 7/2006 |
| JP | 2007-318560 A | 12/2007 |
| WO | 2006123744 A1 | 11/2006 |

OTHER PUBLICATIONS

Office Action from Japanese Application No. 2008-030601, dated Mar. 30, 2010.

* cited by examiner

*Primary Examiner* — Victor Kostak
(74) *Attorney, Agent, or Firm* — Lerner, David, Littenberg, Krumholz & Mentlik, LLP

(57) ABSTRACT

An information processing apparatus includes a content display control section switching contents to be displayed on a display screen, and a related information display control section displaying, during a switching period when a content displayed on the display screen is switched from one content to another content, related information related to the other content, wherein the related information display control section fades out the related information displayed on the display screen at the time of displaying the other content on the display screen.

9 Claims, 15 Drawing Sheets

FIG.4

| No | PROGRAM | PREFERNCE INFORMATION | DISPLAY SIZE ADJUSTMENT |
|---|---|---|---|
| 1 | ATTORNEY NENE | POPULARITY 5 (OUT OF 5) | LARGE |
| 2 | AROUND JAPAN | RECOMMENDED 4 (OUT OF 5) | LARGE |
| 3 | CHESS No.1 | VIEWERS: MOSTLY ELDERS | LARGE |
| 4 | WITH MOMMY ? | VIEWERS: MOSTLY CHILDREN | LARGE |
| 5 | GOOD NIGHT JAPAN | VIEWING FREQUENCY 5 (OUT OF 5) | LARGE |
| 6 | SOB STORIES | REGISTERED BY USER: INTERESTED | LARGE |
| 7 | Sta. MUSIC | REGISTERED BY USER: NOT INTERESTED | SMALL |
|  | ... | ... | ... |

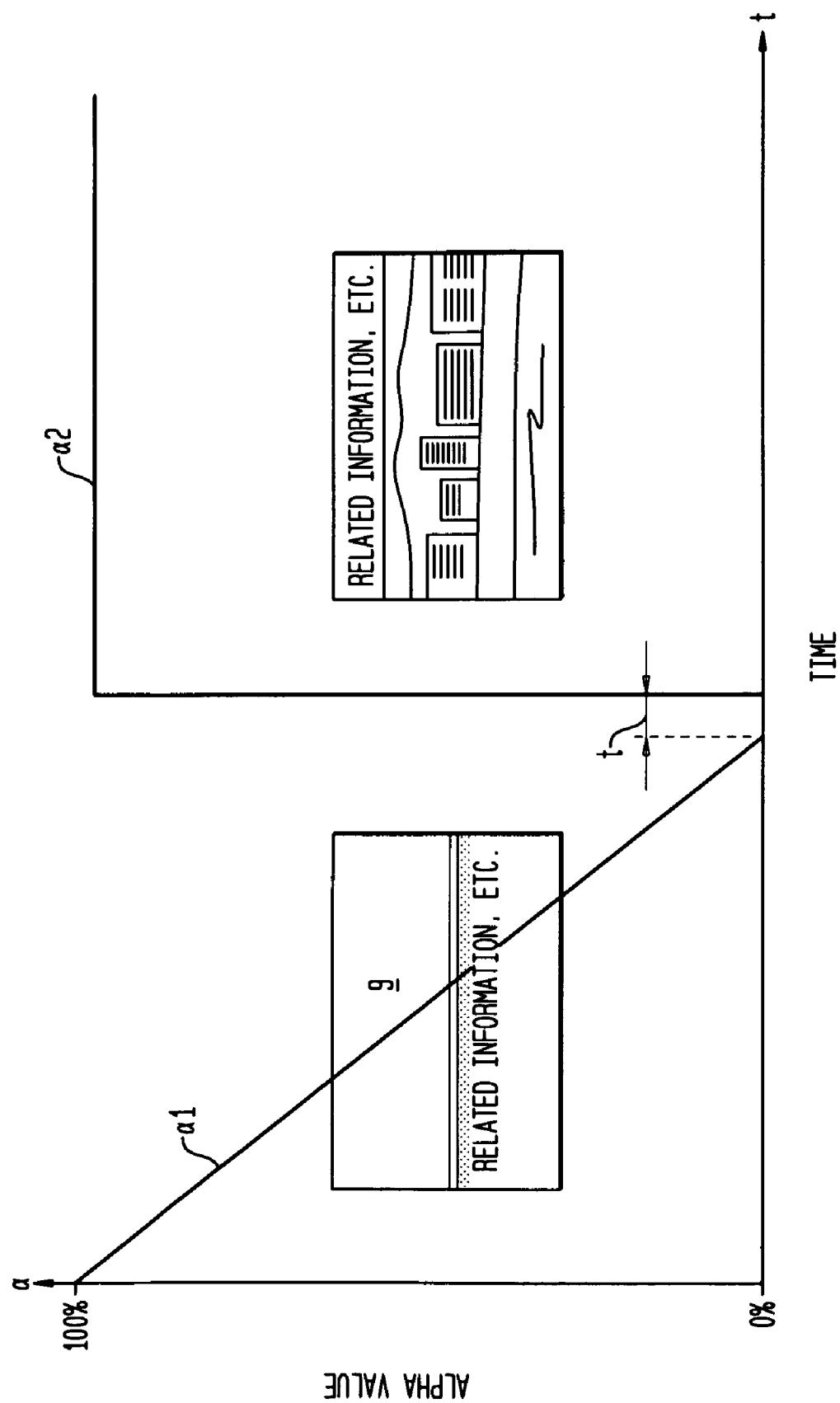

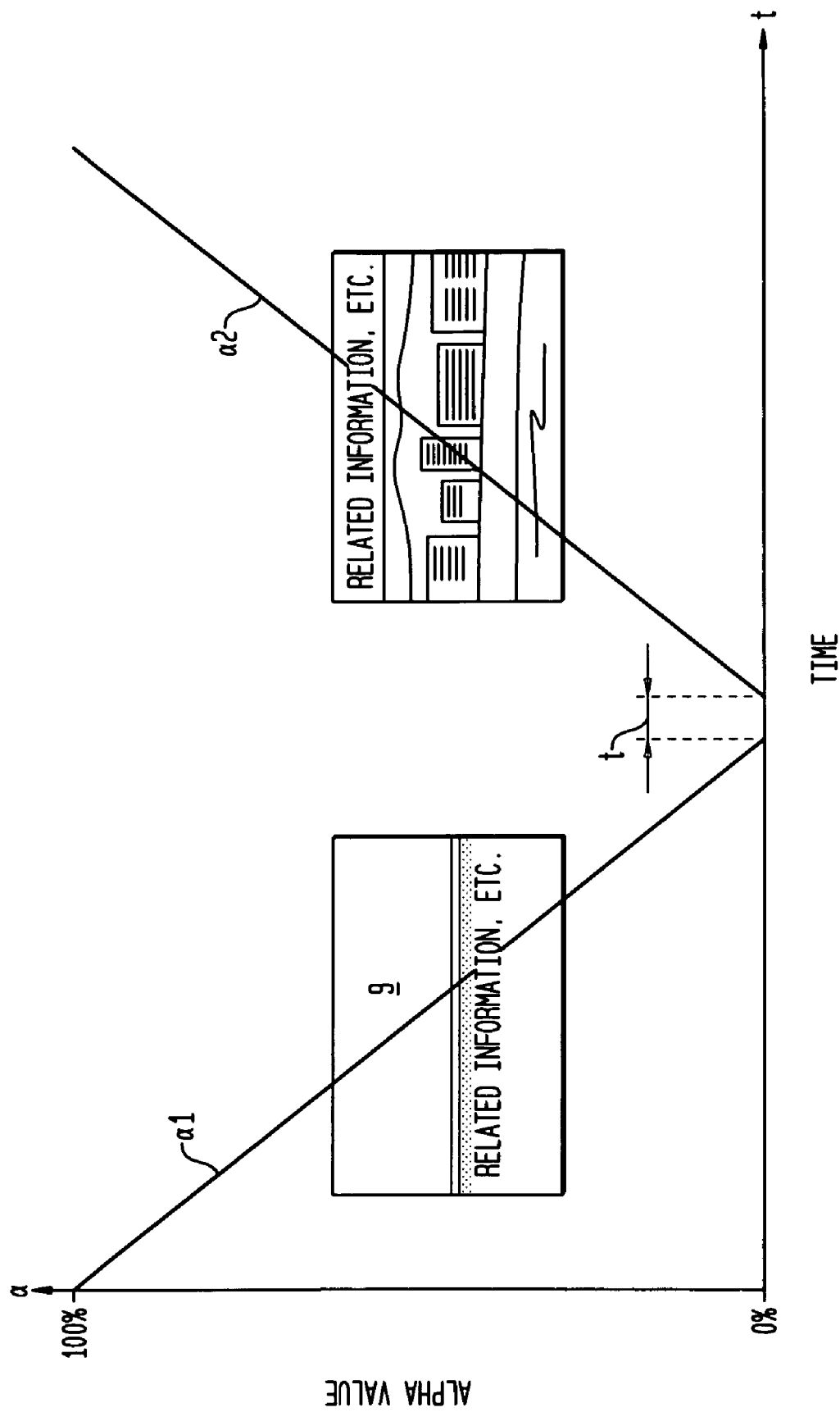

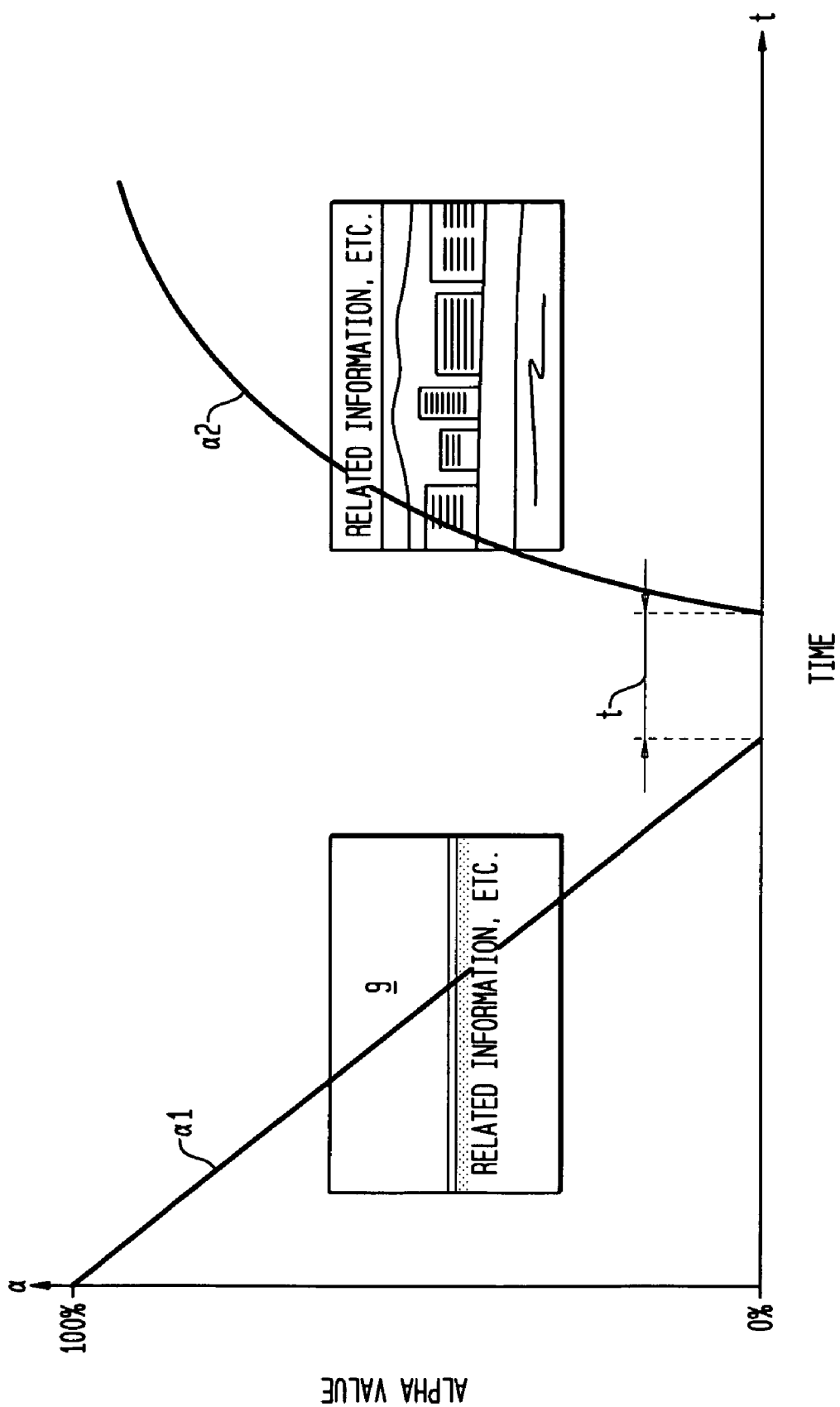

APPARATUS, METHOD AND PROGRAM FOR ENABLING CONTENT DISPLAYED ON A DISPLAY SCREEN TO BE SWITCHED

CROSS REFERENCES TO RELATED APPLICATIONS

The present application claims priority from Japanese Patent Application No. JP 2008-030601, filed in the Japanese Patent Office on Feb. 12, 2008, the entire content of which is incorporated herein by reference.

BACKGROUND OF THE INVENTION

1. Field of the Invention

The present invention relates to an information processing apparatus, an information processing method, and a program for displaying a predetermined content on a display screen.

2. Description of the Related Art

A broadcast receiver, such as a television, performs channel switching of a content to be displayed on a display screen in response to, for example, a user operation or the like. At this time, when a display video image of the display screen is switched from a content on a channel (a content) to a content on another channel (another content), sometimes there is a period when no content is displayed on the display screen. During this switching period, a "black screen (a state where a desired content is not displayed on the display screen. It is not limited to black, and is also referred to as "blank")", for example, is displayed on the display screen. Herein, this state where the black screen is displayed, that is, the state where a desired content is not displayed, will be also referred to as "blanking". The blanking makes a user anxious as to whether the desired content will be displayed or not until the other content is displayed on the display screen, or stresses out the user by making him wait until the desired content is displayed. Such a blanking is conspicuous in an information processing apparatus displaying digital broadcast recently started, and due to the increase in information amount, a period it takes to process digital signals lengthens and the blanking interval (switching period) also lengthens.

To cope with this, JP-A-2006-197492 and JP-A-2006-141030 disclose information processing apparatuses for reducing the blanking at the time of switching channels. According to the information processing apparatus of JP-A-2006-197492, during the switching period, program information (program guide) of a switch-destination content (program) is displayed while displaying the content before the switching. On the other hand, according to the information processing apparatus of JP-A-2006-141030, during the switching period, information of a switch-destination program, commercials, and the like are displayed on the display screen. As a result, JP-A-2006-197492 and JP-A-2006-141030 relieve a user from the stress and the like caused by the display of the black screen during the switching period.

SUMMARY OF THE INVENTION

However, according to the information processing apparatuses of JP-A-2006-197492 and JP-A-2006-141030 described above, the program information and commercials are displayed by a process independent from the process during the switching period where the blanking may occur. Thus, switching from one content to program information and the like, or switching from the program information and the like to another content is not performed smoothly, and in many cases, a user is not fully relieved from stress and the like. For example, according to the information processing apparatus of JP-A-2006-197492 described above, during the switching period, a content before switching and program information of a switch-destination content or the like are simultaneously displayed. Thereby, there is a period when a content and program information do not match, and such a display may stress out a user. Also, according to the information processing apparatus of JP-A-2006-141030, a user may often feel that the switching from a display during the switching period to a display of a content after switching is not smooth. Especially, when displaying a commercial during the switching period, the commercial and the content after switching are not related, thus causing a user to feel more stress. Thus, it is desired by many users that the switching of contents is performed more smoothly reducing the stress felt at the time of switching.

Thus, in view of the foregoing, it is desirable to provide a new and improved information processing apparatus, an information processing method, a program capable of, when switching contents to be displayed on a display screen, switching contents more smoothly and reducing the stress felt by a user at the time of switching.

According to an embodiment of the present invention, there is provided an information processing apparatus including a content display control section switching contents to be displayed on a display screen, and a related information display control section displaying, during a switching period when a content displayed on the display screen is switched from one content to another content, related information related to the other content, wherein the related information display control section fades out the related information displayed on the display screen at the time of displaying the other content on the display screen.

According to this configuration, at the time of the content display control section switching contents to be displayed on the display screen, related information can be displayed on the display screen by the related information display control section. Note that the period (time interval) during which related information is to be displayed is the "switching period" which is the time interval taken, in a case where the content display control section switches the content to be displayed on the display screen from one content to another, to switch from a state where a content is displayed on the display screen to where another content is displayed on the display screen. Accordingly, when switching contents, information of a switch-destination content can be provided until the content is actually displayed on the display screen. Further, when the switching period is over, that is, when the other content is displayed, related information displayed on the display screen is faded out by the related information display control section. Note that "when the switching period is over" herein means not only the time the other content is actually displayed on the display screen, but also a predetermined time before the other content is actually displayed. Accordingly, it becomes possible also to notify of the timing the other content is to be actually displayed. Further, it becomes possible to prevent a case where, during the switching period between a state where one content is displayed and until another content is displayed, a desired content is not displayed, that is a "black screen (a state where a video image or an image is not displayed on the display screen. It is not limited to black, and is also referred to as "blank")" is displayed, for example. Accordingly, the stress relating to visibility felt by a user viewing a content at the time of switching contents can be reduced.

Further, the related information display control section may display on the display screen not only related information related to the other content, but also related information related to a subsequent content to be reproduced subsequent to the other content.

According to this configuration, not only related information of the other content that is the switch-destination, but also related information of the subsequent content that is reproduced subsequent to the other content can be displayed on the display screen by the related information display control section. Thus, for example, at the time of switching contents, information of the switch-destination contents (the other content and the subsequent content, and the like) can be provided.

Further, the related information display control section may further display on the display screen a time interval from the end of reproduction of the other content until the subsequent content is reproduced.

According to this configuration, the time interval until the subsequent content is reproduced can also be notified.

Further, the related information display control section may include a display scale adjusting section adjusting, according to the time interval, display scale of at least either of related information related to the other content and related information related to the subsequent content.

According to this configuration, display scale of at least either of related information of the other content and the related information of the subsequent content can be adjusted according to the time interval until the subsequent content is reproduced.

Further, the related information display control section may display the related information on a part of or the whole area of the display screen.

According to this configuration, the related information can be displayed by the related information display control section on a part of or the whole area of the display screen. Accordingly, compared to a case where the related information is displayed on only a part of the area, such as the upper part of the display screen, the related information can be provided in a more emphasized manner and with a higher visibility. Further, in a case where the related information is displayed only on a part of the area, the user viewing the screen is made conscious that no image is displayed on the other areas (that it is a black screen). Accordingly, during the switching period, the user is aware that "he is being made to wait until the other content is displayed." On the other hand, as with the above-described configuration, by displaying the related information on the whole area of the display screen, the user does not have to view the black screen and the like, and does not have to feel that he is being made to wait as described above.

Further, the content display control section may fade in the other content to display on the display screen.

According to this configuration, when the switching period is over, contrary to the related information fading out, the other content is faded in and displayed on the display screen. Accordingly, the switching from the related information, which is a video image to be displayed on the display screen, to the other content can be performed more smoothly. Note that, at this time, the fade-out of the related information and the fade-in of the other content may be partially overlapped allowing the cross-fade of the related information and the other content.

The related information display control section may provide a non-display period where no image is displayed on the display screen after the related information is faded out and before the other content is displayed.

According to this configuration, for example, the length of the switching period that varies depending on the information amount of the other content or the like can be adjusted by the non-display period. Further, compared to a case where the other content is displayed immediately after the related information is faded out, providing the non-display period allows the video images on the display screen to be connected smoothly.

Further, the related information display control section may include a display scale adjusting section adjusting, according to the related information, display scale of the related information on the display screen.

According to this configuration, according to the related information, display scale of the related information itself on the display screen can be adjusted by the display scale adjusting section. Accordingly, it becomes possible to display predetermined information with emphasis or without unnecessary emphasis.

Further, the information processing apparatus may include a priority information storing section storing priority information indicating priority degree of a content to be displayed on the display screen, and the related information display control section may include a display scale adjusting section adjusting, according to the priority information, display scale of the related information on the display screen.

According to this configuration, the degree of emphasis for each piece of related information at the time of displaying can be adjusted by the display scale adjusting section, such as to display related information with high priority with large size.

Further, the related information display control section may further include a priority information generating section generating the priority information based on related information of a content already displayed on the display screen.

According to this configuration, priority information can be generated by the priority information generating section based on related information of the content already displayed. Accordingly, priority information reflecting the preferences and the like of the user of the information processing apparatus can be generated.

Further, the related information may include attribute information of the other content, and the information processing apparatus may further include an image adding section adding, according to the attribute information, a predetermined image to the related information to be displayed on the display screen.

According to this configuration, a predetermined image according to attribute information of the other content can be added to the related information by the image adding section. Accordingly, related information including also the predetermined image can be displayed on the display screen during the switching period. By displaying an image in such a manner, compared to a case where attribute information of the other content is provided using letters or the like, attribute information can be provided in a form that can be intuitively grasped by the user without the user having to read the information.

Further, according to another embodiment of the present invention, there is provided an information processing method including the steps of switching contents to be displayed on a display screen, displaying, during a switching period when a content displayed on the display screen is switched from one content to another content, related information related to the other content, and fading out the related information displayed on the display screen at the time of displaying the other content on the display screen.

Further, according to another embodiment of the present invention, there is provided a program causing a computer to realize a content switching function of switching contents to be displayed on a display screen, a related information displaying function of displaying, during a switching period when a content displayed on the display screen is switched from one content to another content, related information related to the other content, and a display state changing function of fading out the related information displayed on the display screen at the time of displaying the other content on the display screen.

According to the embodiments of the present invention described above, at the time of switching contents to be displayed on the display screen, contents can be switched more smoothly and the stress felt by the user at the time of switching can be reduced.

BRIEF DESCRIPTION OF THE DRAWINGS

FIG. 4 is an explanatory diagram illustrating an example of preference information used by the digital television according to the present embodiment.

FIG. 6A is an explanatory diagram showing an example of the way the digital television according to the present embodiment changes a display state.

FIG. 6B is an explanatory diagram showing an example of the way the digital television according to the present embodiment changes a display state.

FIG. 6C is an explanatory diagram showing an example of the way the digital television according to the present embodiment changes a display state.

DETAILED DESCRIPTION OF THE PREFERRED EMBODIMENTS

Figure 1:
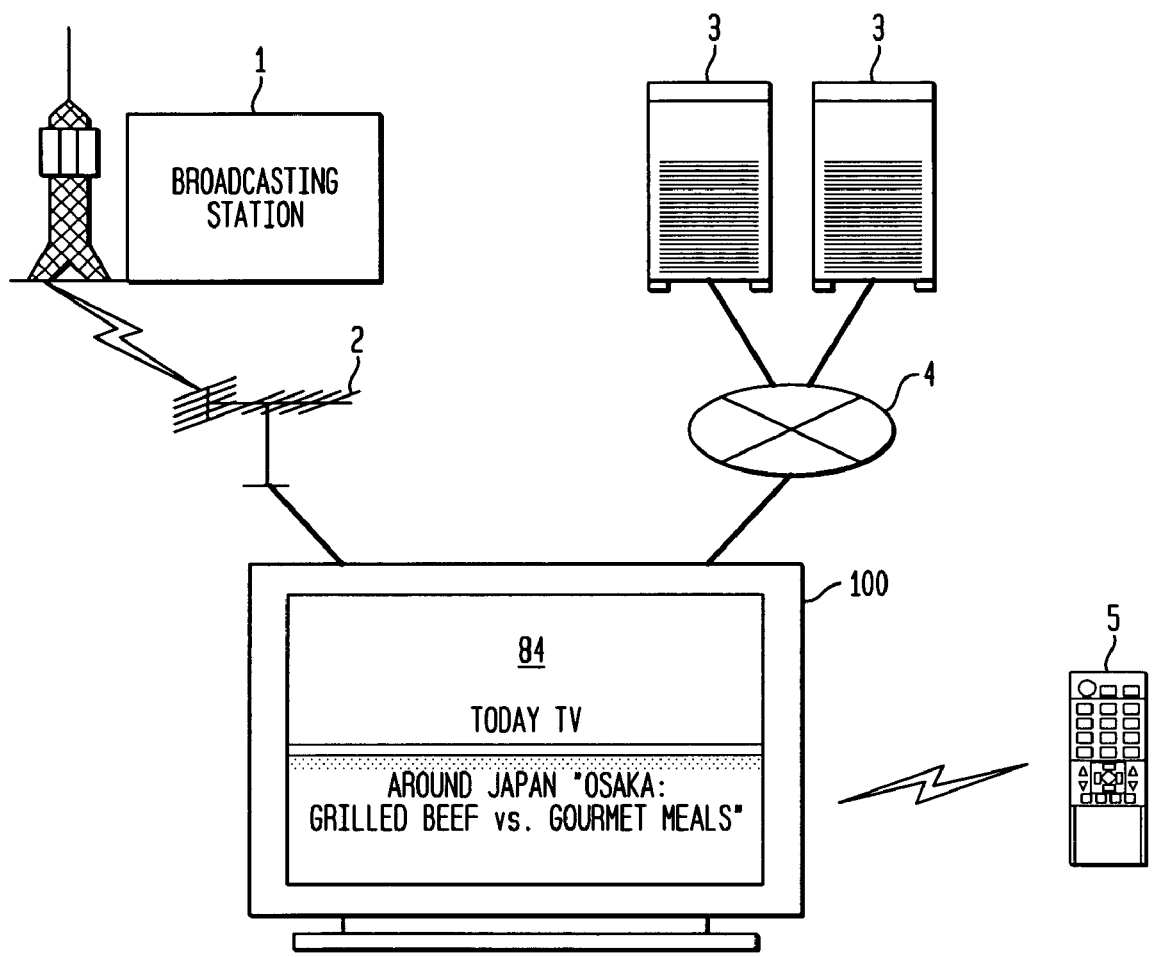
FIG. 1 is an explanatory diagram illustrating a digital television according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

<Embodiment>

An information processing apparatus according to the present invention can be applied to various devices capable of displaying a content on a display screen and switching the content. In an embodiment of the present invention to be described hereunder, for the sake of convenience of explanation, a case will be described as an example where the information processing apparatus according to the present invention is applied to a "digital television". Also, the description is made with a "program" digitally broadcast as an example of the content to be displayed on the display screen. However, it is needless to say that the present invention is not limited to such. Other information processing apparatuses to which the present invention can be applied include, for example, a display device such as a digital television or the like, a reproducing device such as a video player, a video cassette recorder, a hard disk drive (HDD) recorder, a digital versatile disc (DVD) player, a DVD recorder or the like, a device, such as a mobile telephone, a computer, a personal digital assistant (PCA), a music reproducing device, that can receive television broadcast and reproduce recorded content, or the like. Also, the content is not limited to a program that is actually broadcast, and may be a content recorded in a recording device or the like, for example.

(Configuration of Digital Television 100)

FIG. 1 is an explanatory diagram illustrating a digital television according to an embodiment of the present invention. As shown in FIG. 1, a digital television 100 according to the present embodiment receives with an antenna 2 a broadcast wave of a digital broadcast transmitted from a broadcasting station 1. This broadcast wave includes programs of a plurality of channels (an example of a content), and includes video data, audio data, an electronic program guide (EPG; hereinafter, also referred to as "program information") and the like of each program. The digital television 100 obtains the broadcast wave, performs tuning, analog-digital conversion, demultiplexing, decoding or the like on the broadcast wave, displays a content (program) represented by the video data on the display screen, and outputs audio represented by the audio data from an audio output device. Further, the digital television 100 displays on the display screen or outputs from the audio output device program information in response to a user operation and the like. Note that the digital television 100 is controlled by an operation signal output from a controller 5 or the like in response to the user operation. Also, the digital television 100 is connected, for example, via a network 4 such as the Internet, with one or more servers 3, such as a portal site server, publishing predetermined information on the network 4. Accordingly, the digital television 100 can obtain desired information from the server 3.

Figure 2:
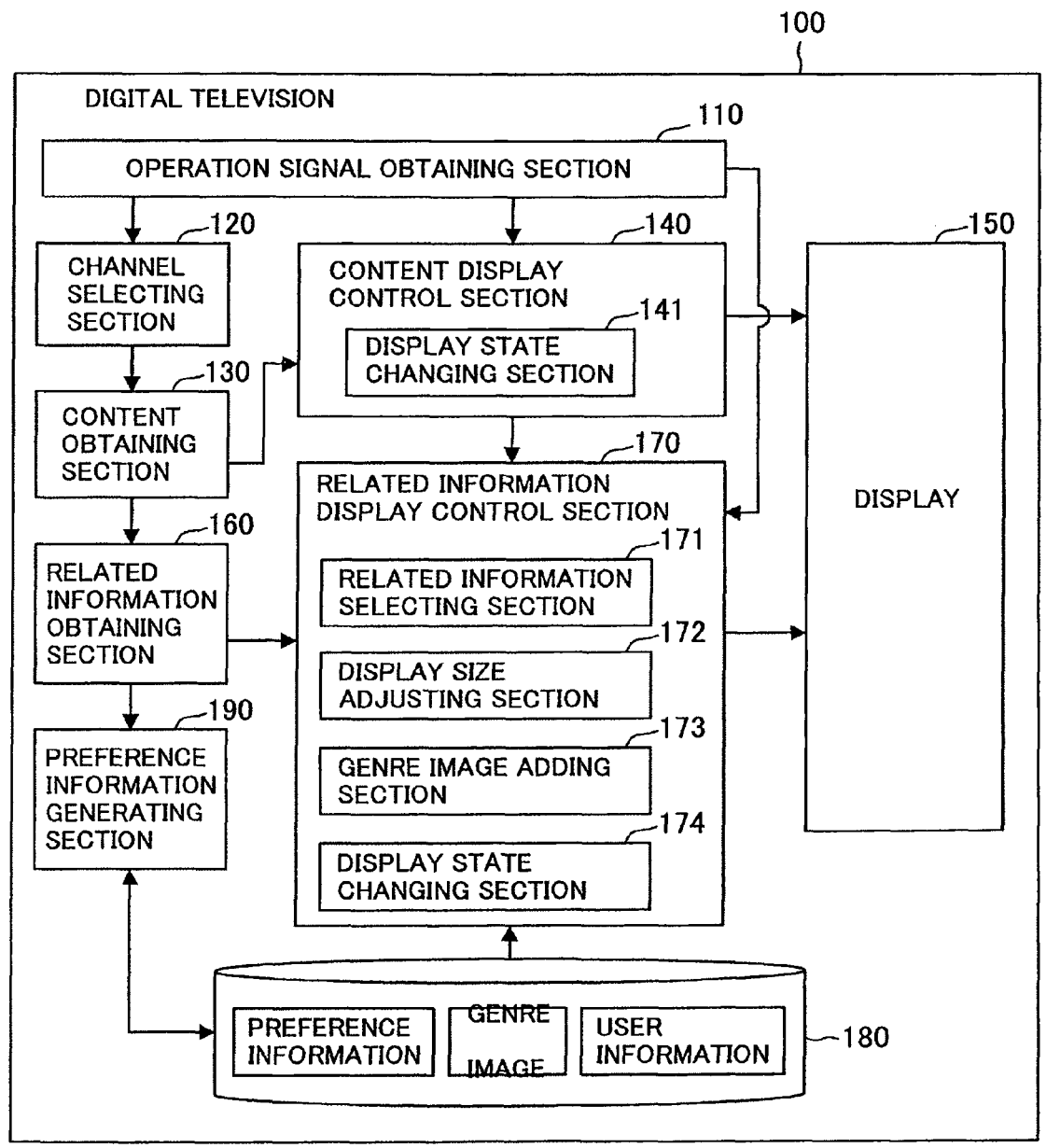
FIG. 2 is an explanatory diagram illustrating a configuration of the digital television according to the present embodiment.

FIG. 2 is an explanatory diagram illustrating a configuration of the digital television according to the present embodiment. As shown in FIG. 2, the digital television 100 according to the present embodiment includes an operation signal obtaining section 110, a channel selecting section 120, a content obtaining section 130, a content display control section 140, a display 150, a related information obtaining section 160, and a related information display control section 170.

The operation signal obtaining section 110 obtains an operation signal output, in response to a user operation, by a predetermined switch or the like provided on the controller 5 or on the digital television 100 as shown in FIG. 1. The operation signal is output to the channel selecting section 120, the content display control section 140, the related information display control section 170 described later, or the like. These structural elements that obtained the operation signal operate in a predetermined way in response to the operation signal. Incidentally, it is needless to say that the operation signal can be output to structural elements other than the channel selecting section 120, the content display control section 140 and the related information display control section 170.

The channel selecting section 120 selects, in response to the operation signal output by the user operation, a channel to tune in. At this time, if the input operation signal indicates another channel when one channel is selected, the channel selecting section 120 selects the other channel. Then, the channel selecting section 120 outputs to the content obtaining section 130 information indicating the selected channel.

The content obtaining section 130 obtains data of the program (hereinafter, also referred to as "program data") being broadcast on the channel selected by the channel selecting section 120. Then, the content obtaining section 130 outputs the obtained program data to the content display control section 140. That is, when the channel selecting section 120 switches the channel to be selected, the content obtaining section 130 also switches the program to be obtained from a program on a channel before switching (an example of a content) to a program on a channel after switching (an example of another content). A more concrete example of the content obtaining section 130 will be described below. That is, the content obtaining section 130 includes, for example, a tuner, an analog-digital converting section, a demultiplexer, a decoder, and the like. The content obtaining section 130 tunes to the frequency band of the channel selected by the channel selecting section 120, and obtains a broadcast signal in the frequency band with the antenna 2. Further, the content obtaining section 130 converts the obtained broadcast signal to a digital signal (program data) by the analog-digital converting section. The digital signal is separated into video data, audio data, program information, and the like, by the demultiplexer. Among these, the video data is output to the content display control section 140. Note that the program information is output to the related information obtaining section 160. Also, the audio data is output as sound by the audio output device (not shown). However, for the sake of convenience of explanation, the explanation of the audio data is omitted herein.

The content display control section 140 has the program data (video data) output by the content obtaining section 130 displayed on the display screen of the display 150. That is, when the channel selecting section 120 switches channels and the content obtaining section 130 switches the program data to be obtained from that of a channel to that of another channel, the content display control section 140 switches the program to be displayed on the display screen from a program on a channel (also referred to as "a program") to a program on another channel (also referred to as "another program", "a switch-destination program", or the like). At this time, there is an interval of approximately 1 to 2 seconds between the state where the content display control section 140 is displaying a program on the display screen and until the content display control section 140 actually displays another program on the display screen. As described above, this time interval is herein referred to as a "switching period". The switching period is a time interval needed to perform a predetermined process (regardless of the content of the process) at the time of displaying a program on the display screen, for example. Note that the predetermined process may be the above-described processes performed by the content obtaining section 130, a process of the content display control section 140 displaying on the display screen, and the like. However, it is needless to say that other processes may be performed in the background.

On the other hand, the related information obtaining section 160 obtains program information from the content obtaining section 130. Further, the related information obtaining section 160 can also obtain information, which is stored in the server 3 and published on the network 4, related to the program to be displayed on the display screen. Information including program information demodulated from the broadcast wave and information that can be obtained via the network 4 is also referred to as "related information". That is, related information indicates various information related to a program, and includes various information published on the network 4 as well as the program information included in the broadcast wave. And the related information obtaining section 160 obtains related information related to the program being obtained by the content obtaining section 130. That is, when the channel selecting section 120 switches channels, the content obtaining section 130 switches the program data to be obtained. In response, the related information obtaining section 160 switches the related information to be obtained from related information related to the program before switching to related information related to the program after switching.

The related information display control section 170 obtains the related information obtained by the related information obtaining section 160, and displays the related information on the display screen of the display 150. Note that the related information display control section 170 may display related information in response to the operation signal obtained by the operation signal obtaining section 110. Further, the related information display control section 170 also displays related information according to the display state of the video data on the display screen by the content display control section 140.

Incidentally, when the display state of the video image on the display screen by the content display control section 140 is, for example, a blank (a state where, for example, a black screen is displayed) on the display screen during the switching period described above, a user viewing the display screen may feel stressed out. Especially, when searching for a channel on which a desired program is being broadcast by changing channels one after the other, that is, when performing so-called "zapping", the user cannot view the video of the program on the switch-destination channel until the switching period is over, and thus, smooth zapping operation is prevented.

Figure 3A:
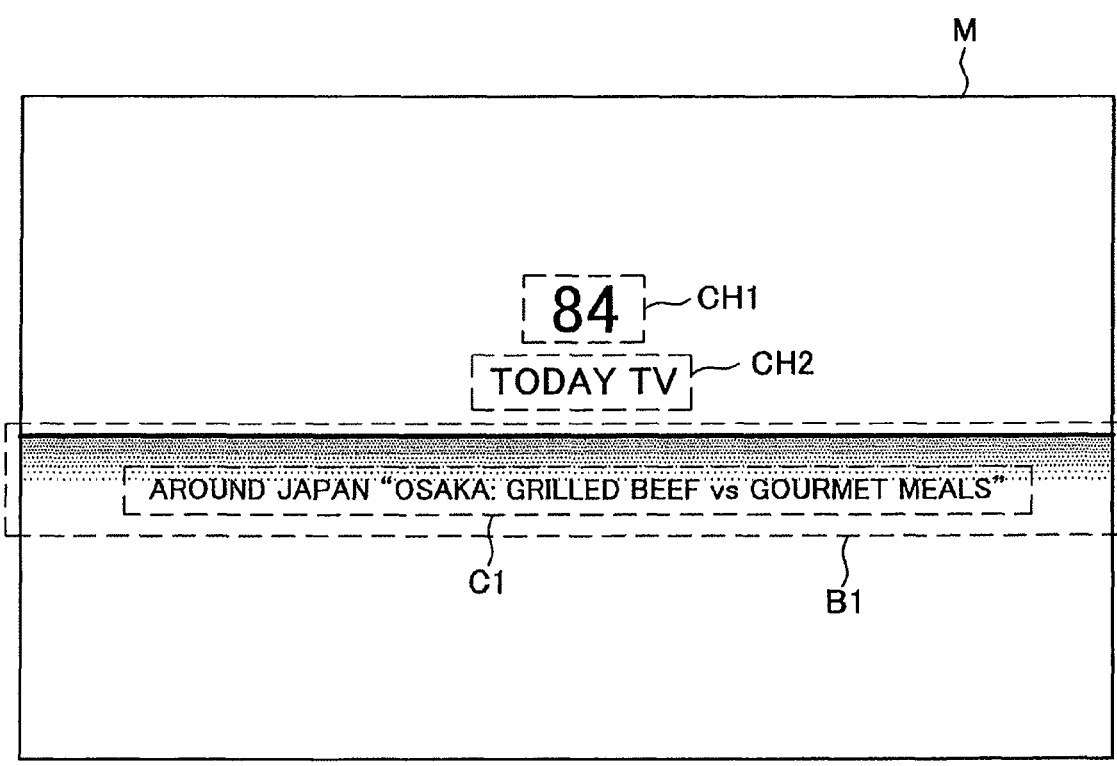
FIG. 3A is an explanatory diagram illustrating an example of related information to be displayed on the digital television according to the present embodiment during a switching period.

Thus, the related information display control section 170 displays related information of the program on the channel after change during the switching period so that the display screen does not become blank. An example of related information to be displayed during the switching period is shown in FIG. 3A. FIG. 3A shows a case where related information C1, CH1 and CH2 of the program on the switch-destination channel is displayed on the display screen (display video image M). Related information C1 indicates the title of the program currently being broadcast (reproduced) on the switch-destination channel. Related information CH1 indicates the broadcasting station number of the switch-destination channel. Related information CH2 indicates the name of the broadcasting station of the switch-destination channel. Displaying related information during the switching period as such allows a user to perform zapping operation, being aware of the type of the switch-destination program by referring to the related information displayed on the display screen.

At this time, as shown in FIG. 3A, the related information display control section 170 may display related information on a part of or the whole area of the display video image M to be displayed on the display screen. By displaying related information on the whole screen, much information may be displayed as related information. Also, compared to a case where related information is displayed only on a part of the display screen (for example, on the upper area), the visibility of related information is improved.

Figure 3B:
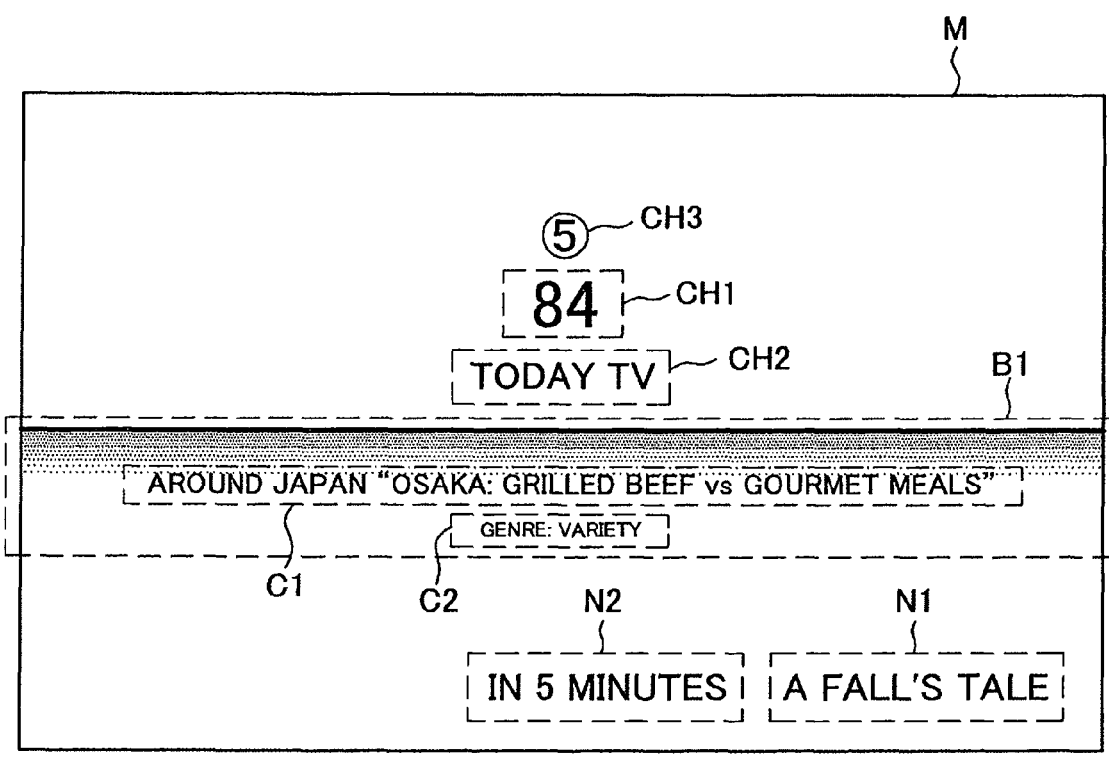
FIG. 3B is an explanatory diagram illustrating an example of related information to be displayed on the digital television according to the present embodiment during a switching period.

Further, another example of related information to be displayed during the switching period is shown in FIG. 3B.

As shown in FIG. 3B, the related information display control section 170 may also display on the display screen, as well as related information of the switch-destination program, related information N1 of a program (an example of a subsequent content) to be broadcast on the switch-destination channel subsequent to the switch-destination program. At this time, the related information display control section 170 displays together on the display screen program information of the subsequent program when, for example, the remaining time of the switch-destination program (the time interval until the end of broadcasting (reproduction) of the switch-destination program and the start of broadcasting of the subsequent program) is less than a predetermined threshold. Incidentally, the related information display control section 170 may display together on the display screen the remaining time (related information N2 in FIG. 3B). At this time, the related information display control section 170 can also display the remaining time using a progress bar or the like without depending on words, making it easier to visually grasp the remaining time. At a timing when the subsequent program is starting in a moment, related information of the subsequent program is extremely useful as a basis for judging whether to select the channel or not. Accordingly, displaying together related information of the subsequent program as such allows a user to perform zapping operation, being conscious of what is to be broadcast subsequent to the switch-destination program, Accordingly, operability for the user can be further improved.

Note that related information to be displayed on the display screen during the switching period is not limited to the above-described related information C1, CH1, CH2, N1 and N2. For example, as related information, for example, as shown in FIG. 3B, related information C2 indicating the genre of the switch-destination program, related information CH3 indicating the number (corresponding to the button number of the controller 5 or the like) assigned to the switch-destination channel in the digital television 100, and the like may also be displayed on the display screen during the switching period. Although not shown, the examples of related information to be displayed on the display screen during the switch period may further include the logo of broadcasting station, broadcast start time and/or broadcast end time of the switch-destination program, program information, such as further detailed information of contents, of the switch-destination program, preference information of the program (described later in detail), time until the video data of the switch-destination program is displayed on the display screen (for example, a count display or the like), a thumbnail image of the switch-destination program (still picture image), commercials, and the like.

Further, to further reduce the stress of a user as described above, and also, to improve the operability for the user, the digital television 100 according to the present embodiment also includes a storage unit 180 and a preference information generating section 190. Also, the related information display control section 170 includes a related information selecting section 171, a display size adjusting section 172, a genre image adding section 173, and a display state changing section 174, and the content display control section 140 includes a display state changing section 141.

The storage unit 180 is an example of a priority information storing section, and stores preference information, genre image and user information, for example. Among these, an example of preference information is shown in FIG. 4.

"Preference information" is an example of priority information, and indicates the priority degree of a program to be displayed on the display screen, such as popularity level of the program, recommendation level of the program, age group and/or sex of the viewers of the program, viewing tendency of a user, and the like. This preference information includes related information of programs displayed on the display screen in the past by the user.

Preference information of a program, such as popularity level of the program (No. 1 in FIG. 4), recommendation level of the program (No. 2 in FIG. 4), age group and/or sex of viewers of the program (Nos. 3, 4 in FIG. 4) described above may be included in the program information of the program, and may be obtained from the server 3 connected via the network 4, or the like. That is, the priority degree is included in related information, and the priority degree obtained by the related information obtaining section 160 is stored in the storage unit 180.

On the other hand, priority degree indicating the preference unique to a user, such as the viewing tendency of the user (No. 5 in FIG. 4) described above, is generated by the preference information generating section 190. The preference information generating section 190 makes the storage unit 180 store related information obtained by the related information obtaining section 160. And, based on related information of a plurality of programs displayed in the past that was made to be stored in the storage unit 180, the preference information generating section 190 analyzes the viewing tendency of a user, and generates priority degree indicating the preference unique to the user. Priority degree to be generated may be, for example, a genre frequently displayed, a program that is broadcast in several installments, one or more of which are displayed on the display screen by the user (it does not have to be the same installment), a keyword, a producer or a performer common to related information of 2 or more viewed programs, time slot with high displaying frequency, or the like.

The user can also register preference information himself. The registered preference information indicates the priority degree that can be set by the user himself, as shown in Nos. 6, 7 in FIG. 4 as examples.

Figure 5A:
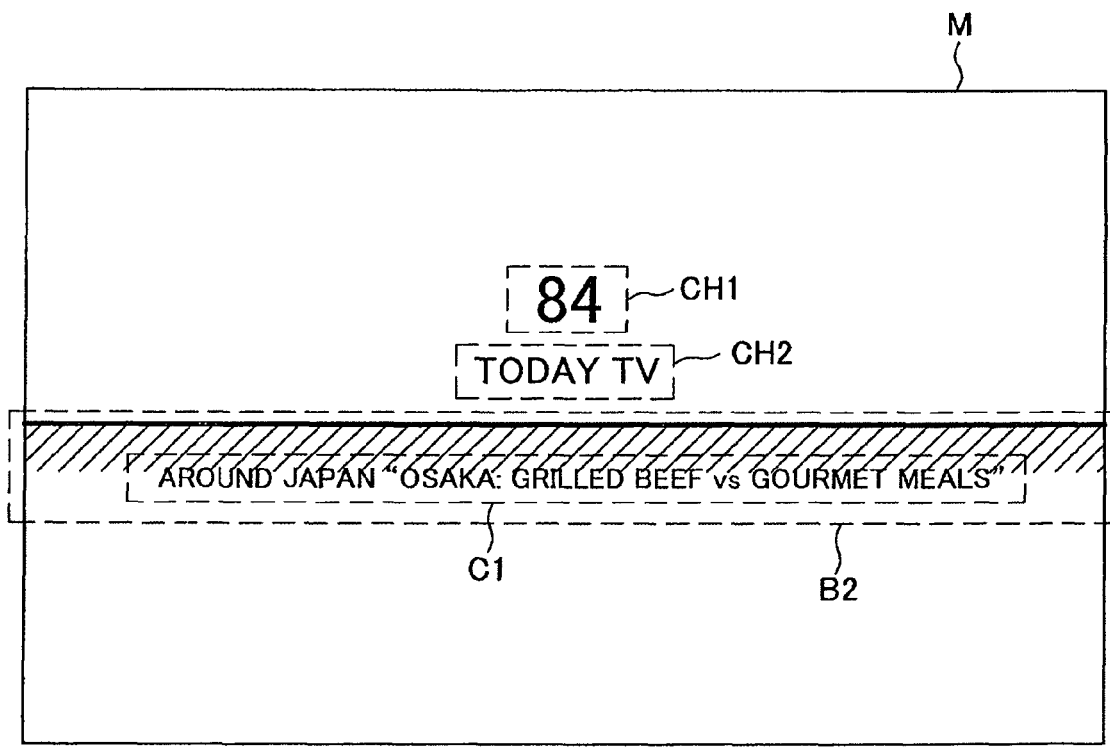
FIG. 5A is an explanatory diagram illustrating an example of a genre image to be displayed on the digital television according to the present embodiment during a switching period.
Figure 5B:
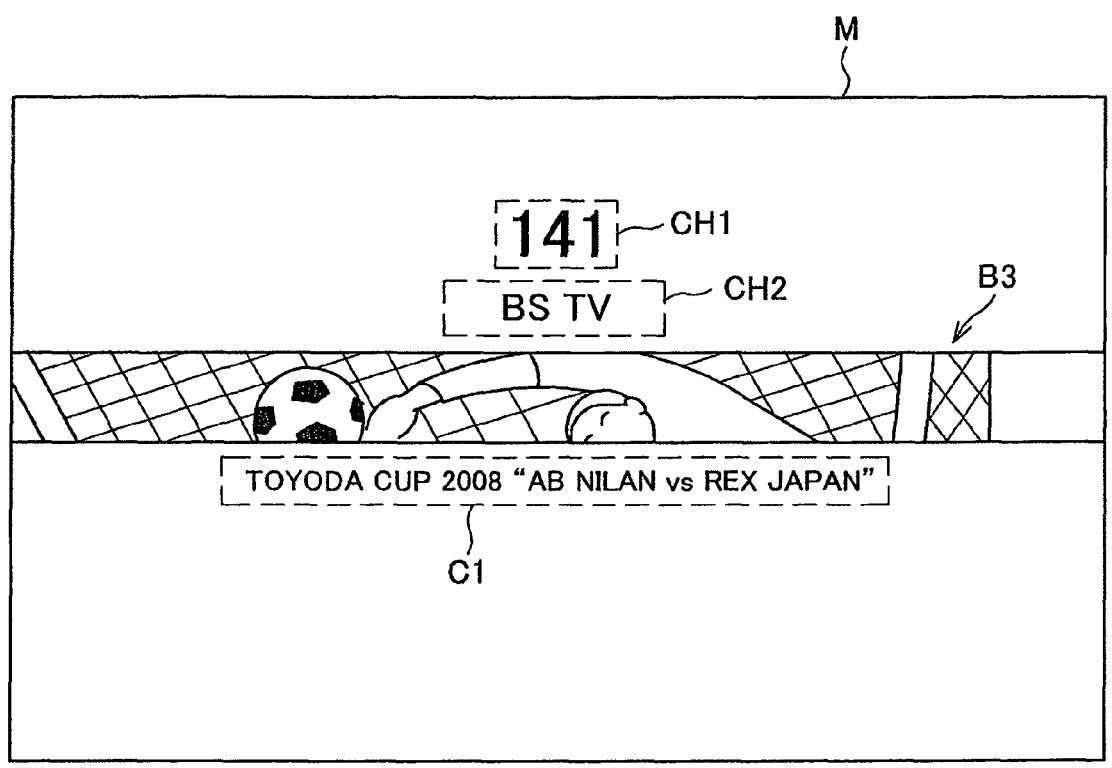
FIG. 5B is an explanatory diagram illustrating an example of a genre image to be displayed on the digital television according to the present embodiment during a switching period.

"Genre image" is an example of a predetermined image, and an image in accordance with the genre (attribute) of a program is stored. That is, the storage unit 180 stores genre information and a corresponding image in relation with each other. The image may be, for example, banner B1 in gradient colors as shown in FIG. 3A, banner B2 as shown in FIG. 5A (banners with color or design different from that shown in FIG. 5A, for example), banner B3 showing a picture as shown in FIG. 5B (a picture suggestive of the genre), or the like.

"User information" includes, for example, attribute information of a user, setting information of the digital television 100 that is set automatically or by the user, or the like.

Attribute information of a user may be, for example, age of the user (may be the birth date), sex of the user, program genre favored by the user, producer or performer favored by the user, or the like. Setting information may be numbers assigned to respective channels in the digital television 100 (for example, the number "5" shown in FIG. 3B; corresponding to the button number of the controller 5 or the like), or the like.

The related information selecting section 171 selects related information to be displayed on the display screen during the switching period. As described above, there is large amount of related information that can be displayed on the display screen during the switching period even only for the switch-destination program. The related information selecting section 171 selects, among the related information, related information to be displayed on the display screen. If too much information is displayed on the display screen, it becomes difficult for the user to become aware of appropriate information during the switching period. Thus, the related information selecting section 171 can select appropriate information to be provided to the user. Also, if, for example, the remaining time of the switch-destination program is less than a predetermined threshold, the related information selecting section 171 may also select related information of a program subsequent to the program as the related information to be displayed on the display screen during the switching period.

The display size adjusting section 172 is an example of a display scale adjusting section, and adjusts the display size of related information selected by the related information selecting section 171 on the display screen. That is, the display size adjusting section 172 adjusts the display scale of related information. At this time, the display size adjusting section 172 adjusts the display size of related information based on at least one of the remaining time of the switch-destination program, preference information, user information and related information.

Hereunder, an example of adjusting the display size will be described more concretely.

As the adjustment according to the remaining time, as shown in FIG. 3B, the display size adjusting section 172 adjusts the display size of related information N1 of the subsequent program according to the remaining time of the program being broadcast at the time. For example, if the remaining time is short, that is, the time interval until the start of broadcasting of the subsequent program is short, the display size adjusting section 172 makes the display size of related information N1 of the subsequent program large, and if the remaining time is long, the display size adjusting section 172 makes the display size of related information N1 of the subsequent program small. At this time, the display size adjusting section 172 may also adjust the display size of related information N2 indicating the remaining time. Also, according to the remaining time, the display size adjusting section 172 may adjust the display size of related information C1 and the like of the switch-destination program. By changing the display size of related information N2 according to the remaining time as such, it becomes possible to provide the user with information that the subsequent program will be broadcast shortly in such a way that the user can intuitively grasp the information during zapping operation. Note that, when displaying together related information N1 of the subsequent program, if, for example, the length of the broadcast time of the program is shorter compared to that of other programs, the display size adjusting section 172 can also make the display size of related information N1 of the program small. Such a program whose broadcast time is relatively short is also referred to as a "mini-program", and by making the display size of related information of such mini-program small, it also becomes possible to emphasize a program with long broadcast time.

Also, as the adjustment according to preference information, the display size adjusting section 172 can adjust the display size of related information according to preference information as shown in "display size adjustment" in FIG. 4, for example. Further, as the adjustment according to preference information and related information, if one of the viewing tendencies of the user, "genre frequently displayed", among preference information and the genre indicated by related information of the switch-destination program coincide, the display size adjusting section 172 can also makes the display size of the related information large. Also, by using a keyword in preference information, for example, if the keyword is included in related information of the switch-destination program, the display size adjusting section 172 can also make the display size of the related information large.

Also, as the adjustment according to preference information (or related information) and user information, the display size adjusting section 172 compares, for example, the age group of the viewers of a program shown in No. 3 or 4 in FIG. 4 and the age of the user stored in user information, and if the user fall under the age group of the viewers, the display size adjusting section 172 can also make the display size of related information of the program large.

As such, by changing the display size of related information according to preference information, user information, related information and the like, it becomes possible to provide related information of a program that matches the preference of the user with emphasis during zapping operation.

Also, if the information amount (for example, the number of letters) included in related information to be displayed is large, the display size adjusting section 172 can also adjust the display size of the related information. That is, if, for example, the number of letters of the related information is large, the display size adjusting section 172 can also make the display size of the related information small, for example, so that the related information can be displayed on the display screen. By automatically changing the display size according to the information amount of related information as such, it becomes possible to provide the user with more information.

The genre image adding section 173 is an example of an image adding section, and adds a genre image stored in the storage unit 180 to related information to be displayed on the display screen according to genre information (an example of attribute information) included in related information of the switch-destination program. FIGS. 3A, 5A and 5B show examples of displays to be displayed on the display screen as a result of adding images. For example, in FIG. 3A, banner B1 is displayed along with related information. The genre image adding section 173 changes banner B1 to, for example, banner B2 as shown in FIG. 5A according to the genre of a program. Note that, although a case is shown where the designs of genre images are different for banner B1 and banner B2, it is also possible to change the color of a banner according to the genre, for example. Also, as shown in FIG. 5B, for example, the genre image adding section 173 can also add a picture suggestive of a genre as the genre image according to the genre of a program. By displaying together on the display screen a genre image according to the genre of the switch-destination program as such, it becomes to possible to notify the user of a genre in such a way that the user can intuitively grasp the genre in a limited display time, i.e. the switching period, with more ease than when the genre is displayed with letters or the like.

The display state changing section 174 changes the display state of related information on the display screen during the switching period. Note that, in the present embodiment, a case will be described where the display state changing section 174 adjusts "transparency", as an example of the display state, at the time of displaying related information. The transparency of the display screen is represented with an alpha value. The "alpha value" is a value representing the level of transparency (opacity) at the time of drawing each pixel, and is represented by a real number between "0" and "1". For example, a pixel with the alpha value of, for example, "1" is an opaque pixel, and a pixel with the alpha value of, for example, "0" is a transparent pixel.

At the time of displaying video data of the switch-destination program on the display screen during the switching period, the display state changing section 174 adjusts the alpha value of related information from 0 to 1 to fade out the related information. The alpha values at the time of fade-out are shown in FIGS. 6A to 6C. As shown in FIGS. 6A to 6C, the display state changing section 174 gradually decreases alpha value $\alpha 1$ of related information. Accordingly, the related information fades out at the time the video data is displayed.

Hereunder, an example of a process of fading out related information by the display state changing section 174 is described. That is, if the length of the switching period depends on the time required to prepare (expand) the video data of the switch-destination program, the display state changing section 174 refers to video image preparation state. The preparation state may be indicated by information as to what percentage of video data is ready, for example. And when the video image preparation state exceeds a predetermined value (a threshold or the like), the display state changing section 174 decreases alpha value $\alpha 1$ of related information as shown in FIGS. 6A to 6C.

As such, by fading out related information at the time of displaying video data of the switch-destination program, it becomes possible to notify the user of the timing of displaying the video data of the switch-destination program. Further, the switching between related information and the video data can be made smooth. Accordingly, it becomes possible to further reduce the stress, which may be felt by the user if the display content of the display screen is switched instantaneously in the switching period. Further, the user may decide whether to further change the channel while the related information is fading out, and the display video image can be prevented from abruptly changing while the user is thinking whether to change the channel or not. This also reduces the stress, which may be felt by the user.

Further, as shown in FIGS. 6A to 6C, after the fade-out of related information and before the display of the video data of the program on the channel, the display state changing section 174 provides non-display period t where no image is displayed on the display screen. This non-display period t is preferably shorter than the time required for the fade-out. Note that, if the length of the switching period depends on the time required to develop (expand) the video data of the switch-destination program, the length of the switching period varies according to, for example, the information amount of the video data, the display process speed of the content display control section 140 or the like. Thus, by providing non-display period t, the lengths of the switching periods may be made balanced to a degree where the user is not aware of the difference in the lengths of the switching periods. Further, by providing non-display period t, the switching between related information and the video data can be made more smoothly.

On the other hand, the display state changing section 141 of the content display control section 140 adjusts the transparency to change the display state in the same manner as the display state changing section 174. However, the display state changing section 141 adjusts alpha value $\alpha 2$ of video data (that is, the switch-destination program) that is displayed when the switching period is over or immediately before the switching period is over. Examples of adjusting alpha value $\alpha 2$ of the video data are shown in FIGS. 6A to 6C. In FIG. 6A, the display state changing section 141 renders alpha value $\alpha 2$ of video data to be 1 immediately after non-display period t. That is, in the case shown in FIG. 6A, opaque video data is displayed after related information is faded out and non-display period t has passed. On the other hand, in FIGS. 6B and 6C, the display state changing section 141 gradually increases alpha value $\alpha 2$ of video data from 0 from immediately after non-display period t. Accordingly, in cases shown in FIGS. 6B and 6C, video data fades in after related information is faded out and non-display period t has passed. Note that whether the display state changing section 141 immediately displays the video data as shown in FIG. 6A or gradually fades in the video data as shown in FIG. 6B or FIG. 6C may be set beforehand, but it can also be changed by the user. By fading in the video data as such, switching between related information and video data can be performed more smoothly suiting the preference of the user. Incidentally, hereunder, an example is described with a case where the display state changing section 141 immediately displays the video data as shown in FIG. 6A.

Heretofore, the configuration of the digital television 100 according to an embodiment of the present invention has been described.

Next, referring to FIG. 7, an example of the operation of the digital television 100 according to an embodiment of the present invention will be described.

(Operation of Digital Television 100)

Figure 7:
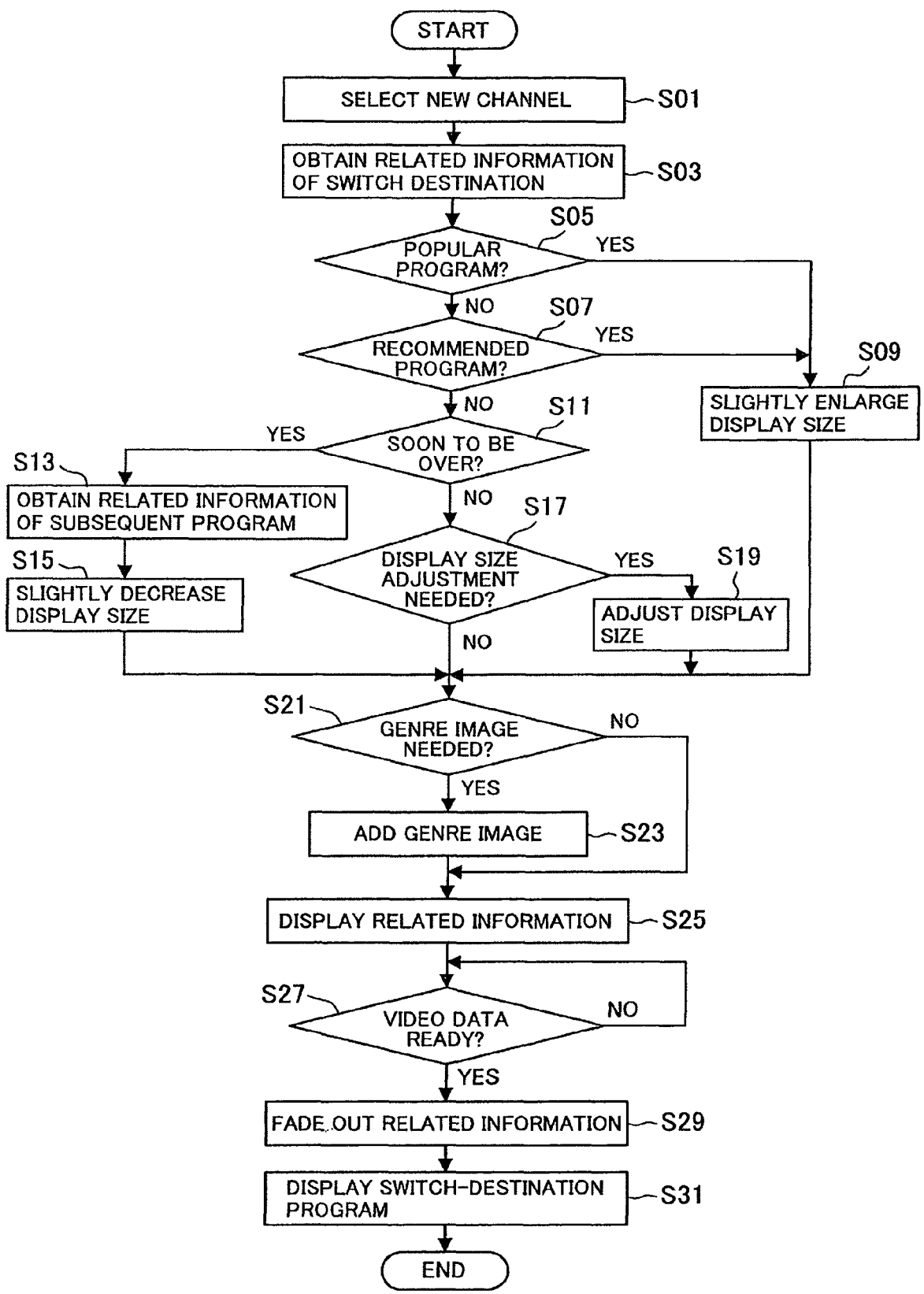
FIG. 7 is an explanatory diagram describing an operation of the digital television according to the present embodiment.

FIG. 7 is an explanatory diagram describing an operation of the digital television according to the present embodiment. When the user operates the controller 5 and performs channel switching operation while a program on a channel is being displayed on the display screen, as shown in FIG. 7, first, step S01 (content switching step) is processed, and the channel selecting section 120 selects a switch-destination channel. Then, the content obtaining section 130 obtains program data being broadcast in the switch-destination channel. Then, the content obtaining section 130 outputs video data of the program data to the content display control section 140, and the content display control section 140 makes preparation for displaying the video data of the switch destination on the display screen. During this preparation period, that is, the switching period, processes of step S03 and the following steps are performed.

In step S03, the related information obtaining section 160 obtains related information related to the switch-destination program. Then, the process proceeds to step S05.

In step S05, the display size adjusting section 172 of the related information display control section 170 checks preference information stored in the storage unit 180, and checks whether the switch-destination program is a popular program or not. If the switch-destination program is a popular program, the process proceeds to step S09, and in step S09, the display size adjusting section 172 makes the display size of related information of the switch-destination program slightly larger. On the other hand, if the switch-destination program is not a popular program, the process proceeds to step S07.

In step S07, the display size adjusting section 172 checks preference information stored in the storage unit 180, and checks whether the switch-destination program is a recommended program or not. If the switch-destination program is a recommended program, the process proceeds to step S09, and in step S09, the display size adjusting section 172 makes the display size of related information of the switch-destination program slightly larger. On the other hand, if the switch-destination program is not a recommended program, the process proceeds to step S11.

In step S11, based on related information, the related information selecting section 171 checks the remaining time of the switch-destination program, and checks whether the program is ending soon or not. If the program is ending soon, the process proceeds to step S13, and if the program is not ending soon, the process proceeds to step S17.

If the program is a program that is ending soon and the process proceeded to step S13, in step S13, the related information selecting section 171 makes the related information obtaining section 160 obtain related information of the program subsequent to the program on the switch-destination channel, and further, selects related information of the program as related information to be displayed on the display screen. Then, the process proceeds to step S15.

In step S15, the display size adjusting section 172 makes the display size of related information of the program being broadcast on the switch-destination channel at the time slightly smaller. Thereby, related information of the subsequent program becomes relatively large, and thus, is emphasized. After step S15, the process proceeds to step S21.

On the other hand, if the program is not a program that is ending soon and the process proceeded to step S17, in step S17, the display size adjusting section 172 further checks to see whether the display size needs to be adjusted based on at least one of preference information, user information and related information. At this time, the display size adjusting section 172 judges whether the display size needs to be adjusted according to, for example, target age group of the program, viewing tendency of the user, the information amount of related information, or the like. Then, if the display size needs to be adjusted, the process proceeds to step S19, and the display size adjusting section 172 adjusts the display size of related information. On the other hand, if the display size does not need to be adjusted, the process proceeds to step S21.

In step S21, the genre image adding section 173 judges whether or not to add a genre image to related information to be displayed on the display screen. The judgment may be made based on, for example, whether the adding of a genre image is set by the user or not, whether a genre image corresponding to the genre of the switch-destination program is stored in the storage unit 180 or not, or the like. And when adding a genre image, the process proceeds to step S23, and the genre image adding section 173 adds a genre image in accordance with the switch-destination program to related information to be displayed on the display screen. Then, after step S23, the process proceeds to step S25. On the other hand, when not adding a genre image, the process also proceeds to step S25.

In step S25, the related information display control section 170 displays related information on the display screen of the display 150 (related information displaying step). As described above, the period during which related information is displayed is the switching period. After step S25, the process proceeds to step S27.

In step S27, the display state changing section 174 checks the preparation state of video data. If the video data is almost ready to be displayed (for example, if the video data is ready to a degree of more than a predetermined threshold, or the like), the process proceeds to step S29. However, if the video data is not yet ready to be displayed, the display state of related information is maintained.

If the video data is almost ready to be displayed and the process proceeded to step S29, in step S29, the display state changing section 174 fades out related information (display state changing step). Then, the process proceeds to step S31.

In step S31, the display state changing section 141 of the content display control section 140 displays the video data of the switch-destination program after the fade-out of related information is completed and non-display period t has passed. At this time, the display state changing section 141 fades in the video data as necessary. Then, after the process of step S31 is ended, the channel switching operation is terminated.

Heretofore, an example of the operation of the digital television 100 according to the present embodiment has been described. Examples of display video images to be displayed on the display screen by the above-described processes at the time of zapping operation will be shown in FIG. 8.

(Zapping Operation)

Figure 8:
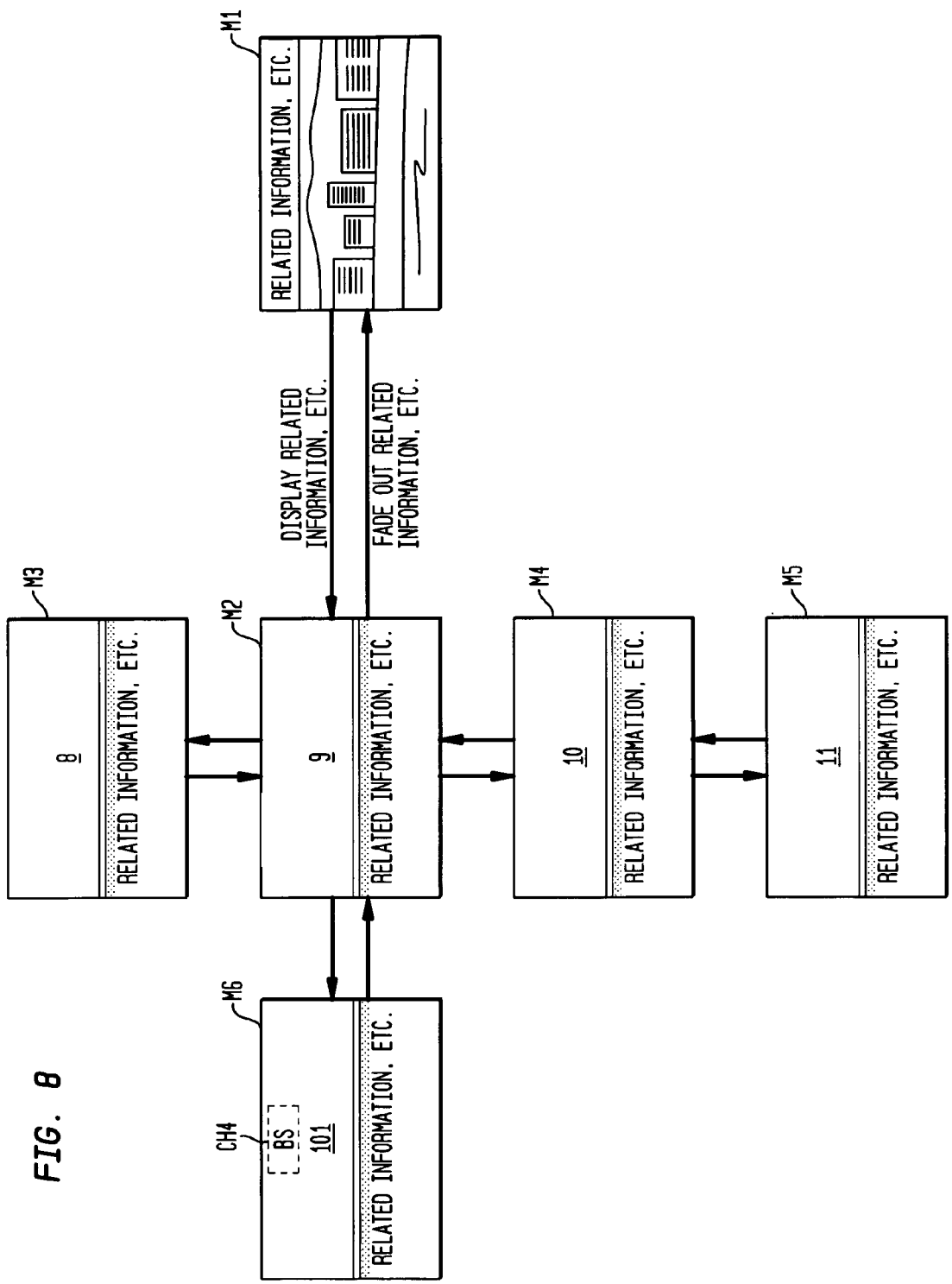
FIG. 8 is an explanatory diagram illustrating an example of a display video image to be displayed on the digital television according to the present embodiment at the time of zapping operation.

As shown in FIG. 8, when zapping operation is performed in a state where display video image M1 of a program is displayed on the display screen, display video image M2 including related information of the program on the switch-destination channel is displayed on the display screen. Then, when the selected channel is further changed, display video images M3, M4, M5 including related information of the program on the channel after changing are displayed on the display screen. At this time, if the type of broadcast wave is changed, for example, from terrestrial wave digital broadcasting to BS digital broadcasting related information CH4 notifying the type of broadcast wave may be displayed on the display screen as related information as shown by display video image M6. And when, for example, while in a state where display video image M2 is being displayed on the display screen, a predetermined time passes and the video data of the channel is almost ready to be displayed, display video image M2 is faded out. Then, the video data of the program on the channel is displayed on the display screen.

(Example of Effect of Digital Television 100)

Heretofore, the digital television 100 according to an embodiment of the present invention has been described.

According to the digital television 100, during the switching period when programs (contents) to be displayed are being switched, such as at the time of switching channels, related information of the switch-destination program can be displayed on the display screen. Accordingly, the user can perform the operation of selecting a channel referring to the related information. Thus, compared to a case where the display screen becomes blank at the time of switching channels, the stress or anxiousness felt by the user can be reduced.

Further, the digital television 100 does not simply display, during the switching period, related information that is displayed when the video data is displayed (refer to display video image M1 of FIG. 8), but adds thereto new related information, adjusts the display scale and the like of related information, and has display information displayed on a part of or the whole area of the display screen. Accordingly, the digital television 100 can provide related information to the user with high visibility, and the stress or anxiousness felt by the user can be effectively reduced.

Further, before displaying the video data of switch destination, the digital television 100 fades out related information. Accordingly, the digital television 100 can make the user become aware of the timing the video data is displayed, and also, switch related information and the video data smoothly. Thus, the digital television 100 can not only further reduce the stress or anxiousness felt by the user, but can also improve the operability for the user during the channel switching operation.

Further, if the remaining time of the switch-destination program is short, the digital television 100 also provides related information of a program subsequent to the switch-destination program. Thus, the user can switch channels referring also to related information of the subsequent program, and the operability for the user during the channel switching operation can further be improved.

Further, as described above, the digital television 100 can display related information on a part of or the whole area of the display screen, appropriately adjust the display size of related information, and display a genre image in accordance with the genre of a program. Thus, the digital television 100 can display more related information on the display screen. Further, compared to a case where only information in letters in the same size is displayed, priority degree included in preference information and genre information included in related information can be provided to the user in such a way that the user can intuitively grasp the information. Accordingly, the operability for the user during the channel switching operation can further be effectively improved.

It should be understood by those skilled in the art that various modifications, combinations, sub-combinations and alterations may occur depending on design requirements and other factors insofar as they are within the scope of the appended claims or the equivalents thereof.

For example, in the above-described embodiment, as shown in FIGS. 6A to 6C, a case is shown where the display state changing section 174 decreases alpha value $\alpha 1$ of related information in a linear-function manner. However, the present invention is not limited to such an example. For example, the display state changing section 174 can also adjust the decrease amount (gradient) of alpha value $\alpha 1$. Further, the display state changing section 174 can also decrease alpha value $\alpha 1$ non-linearly as alpha value $\alpha 2$ shown in FIG. 6C.

Further, in the above-described embodiment, a case is described where the display state changing section 174 changes alpha value $\alpha 1$. However, the present invention is not limited to such an example. For example, the display state changing section 174 can, at the same time as fading out related information, change the display scale and perform zoom out. Further, for example, the display state changing section 174 can also, at the same time as fading out related information, move the display position of the related information to the position (for example, upper part) of related information that is displayed together with the video data shown in display video image M1 of FIG. 8.

Further, in the above-described embodiment, a case is described where non-display period t is provided after the display state changing section 174 fades out related information. However, the present invention is not limited to such an example. For example, non-display period t does not have to be provided. In such a case, immediately after the display state changing section 174 fades out related information, the display state changing section 141 displays the video data that is ready. Further, by partially overlapping the fade-out period for related information by the display state changing section 174 and the fade-in period for video data by the display state changing section 141, it becomes possible to cross-fade related information and the video data.

Figure 9:
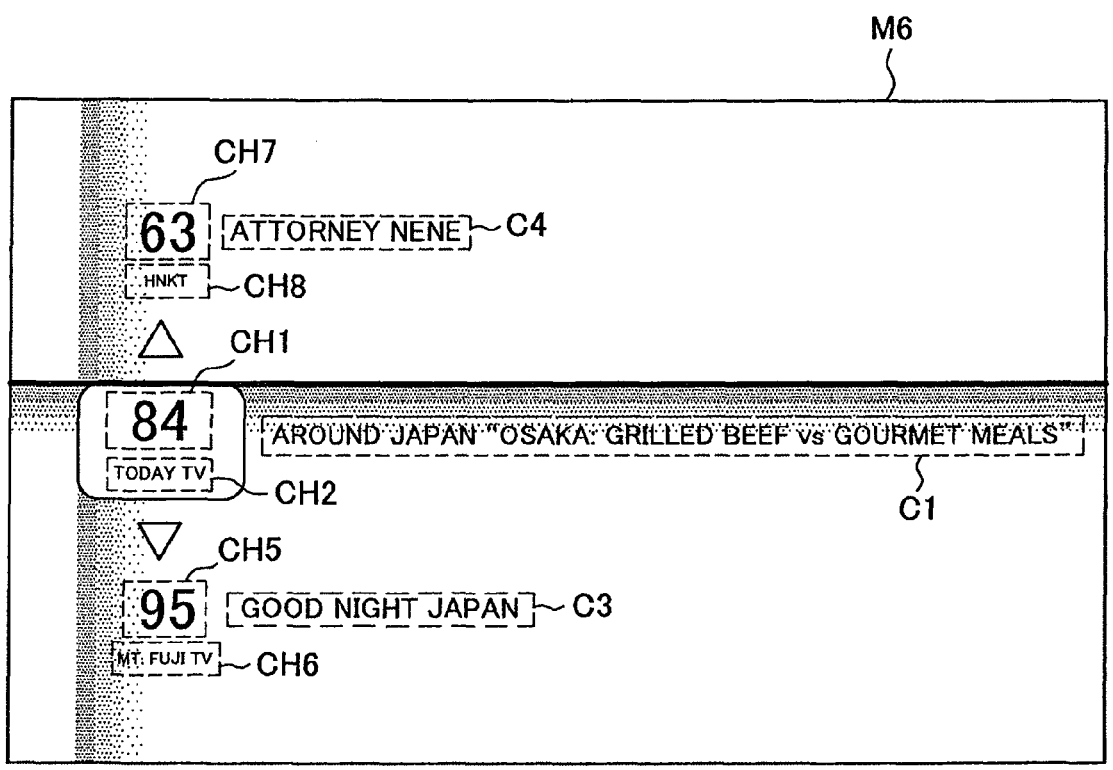
FIG. 9 is an explanatory diagram illustrating another example of related information to be displayed on the digital television according to the present embodiment during a switching period.

Further, in the above-described embodiment, a case is described where the related information display control section 170 displays a banner or the like shown in FIG. 3A or the like. However, the display format of related information that the present invention displays on the display screen is not limited to such an example. For example, the related information display control section 170 can also display related information in the form of a cross media bar (XMB) as shown in FIG. 9. In this case, as shown in display video image M6 of FIG. 9, for example, the related information display control section 170 can display not only related information C1, CH1, CH2 of the program of the switch-destination channel, but also related information C3, CH5, CH6 and related information C4, CH7, CH8 of programs on the channels preceding and following the switch-destination channel. When performing zapping operation, some users push down the up button for switching to a channel with larger number or the down button for switching to a channel with smaller number instead of pushing down the buttons on the controller 5 corresponding to the numbers assigned to the respective channels. Thus, by displaying together related information of the preceding and following channels in the form of XMB as described above, the operability at the time of zapping operation can be improved.

Figure 10:
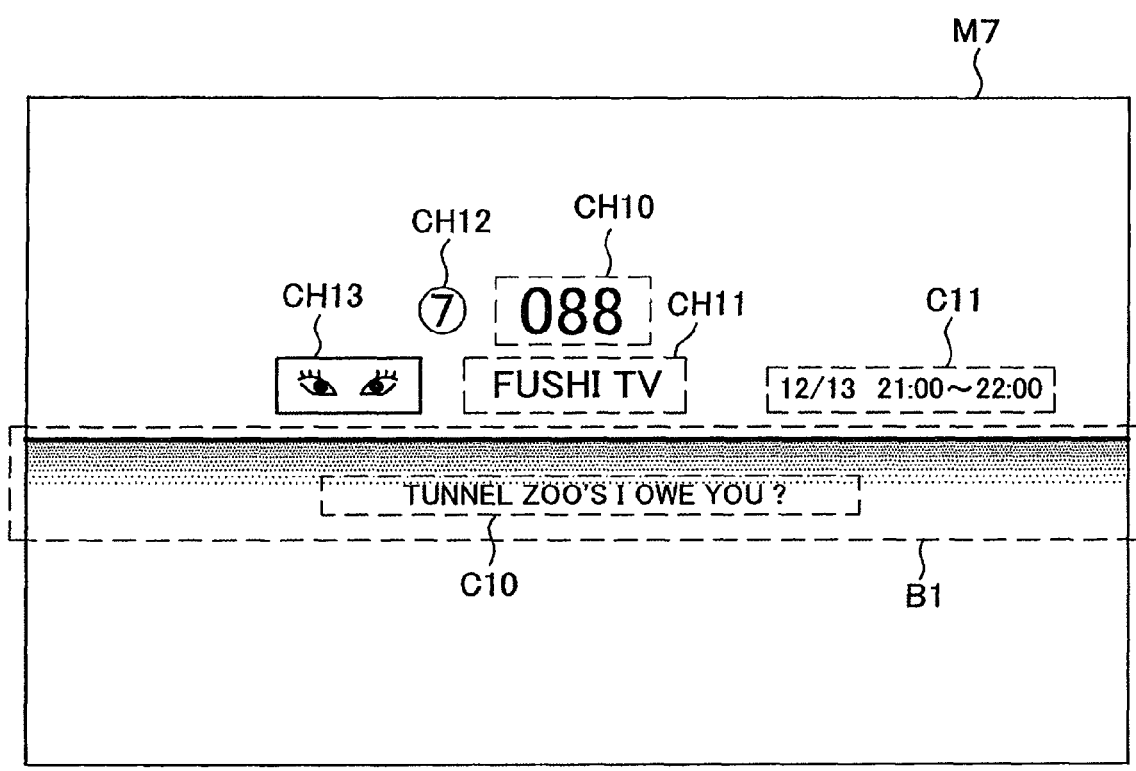
FIG. 10 is an explanatory diagram illustrating an example of related information to be displayed during a switching period in a case where the information processing apparatus according to the present embodiment is applied to a video player.

Further, in the above-described embodiment, a case is described where the information processing apparatus according to the present invention is applied to the "digital television 100". However, the present invention is not limited to such an example. The information processing apparatus according to the present invention includes, for example, a display device such as a digital television or the like, a reproducing device such as a video player, a video cassette recorder, a hard disk drive (HDD) recorder, a digital versatile disc (DVD) player, a DVD recorder or the like, a device, such as a mobile telephone, a computer, a personal digital assistant (PCA), a music reproducing device, that can receive television broadcast and reproduce recorded content, or the like. Further, related information to be displayed during the switching period may be changed according to the device to which the present invention is applied. For example, if the information processing apparatus according to the above-described embodiment is applied to a "video player", the video player may display during the switching period "recorded content information", which is information related to content recorded on a storage medium (for example, a video tape) of the video player, in addition to or instead of the above-described "program information" and "information that can be obtained via the network 4." Further, the video player can also display during the switching period "reproduced content information" indicating the reproduction state such as a resume point (information indicating the position up to which the content had been reproduced previously or has been reproduced at the time) in addition to or instead of reproduced content information. FIG. 10 shows an example of display video image M7 displaying recorded content information among the information.

FIG. 10 is an explanatory diagram illustrating an example of related information to be displayed during the switching period in a case where the information processing apparatus according to the present embodiment is applied to the video player. In this case, the content obtaining section 130 obtains the content recorded on a video tape. Then, the related information obtaining section 160 obtains as related information "recorded content information" (and/or "reproduced content information") of the content also recorded on the video tape. Other structural elements and other operations are the same as those of the above-described digital television 100, and the description thereof will be omitted. Incidentally, "recorded content information" is information relating to the content recorded on the video tape, and may be "attribute information" of the recorded content such as the recorded channel, time slot of the recording, "program information" transmitted along with the content, "information that can be obtained via the network 4" relating to the content, or the like, for example. FIG. 10 shows a case where the related information display control section 170 displays on the display screen of the display 150 related information CH10, CH11, CH12, CH13 and related information C10, C11 along with banner B1. Related information CH10 indicates the number of the broadcasting station that broadcast the recorded content, and related information CH11 indicates the name of the broadcasting station of the recorded content. Related information CH12 indicates the number assigned to the channel on which the recorded was broadcast, and related information CH13 indicates the logo of the broadcasting station that broadcast the recorded content. On the other hand, related information C10 indicates the title of the recorded content, and related information C11 indicates the date, time slot or the like the content was recorded.

The user searches for the recorded content, which he desires to reproduce, by operating the controller 5 (for example, by pushing down the left/right buttons), for example. The video player that obtained the signal output from the controller 5 according to the operation displays on the display screen recorded content information as shown in FIG. 10. On the other hand, as with the above-described related information, recorded content information is faded out when the reproduction of the recorded content is started. Further, when reproduction of a content is over and the next recorded content is to be reproduced successively, the video player can also display during the interval between the contents (an example of the switching period) recorded content information as shown in FIG. 10. Accordingly, by applying the information processing apparatus according to the above-described embodiment to a video player, it becomes possible to improve the operability for the user, and also, to provide a new method for selecting a video content enabling the selection of a recorded content while referring to recorded content information.

Further, the series of processes described in the respective embodiments described above may be executed by a dedicated hardware or by software. When executing the series of processes with software, the above-described series of processes can be realized by executing the program with a general purpose computer or a dedicated computer shown in FIG. 11.

Figure 11:
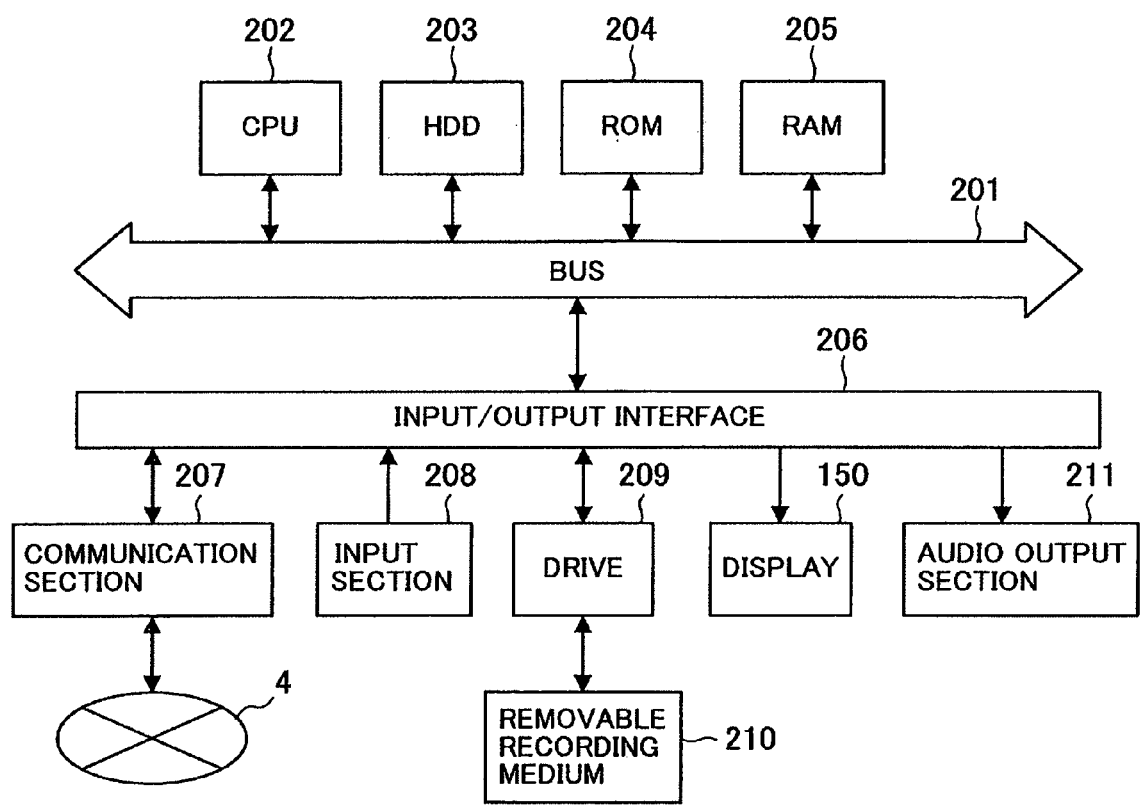
FIG. 11 is an explanatory diagram illustrating a configuration example of a computer realizing a series of processes by executing a program.

FIG. 11 is an explanatory diagram illustrating a configuration example of a computer realizing the series of processes by executing a program. The execution of the program for performing the series of processes by the computer is described below.

As shown in FIG. 11, the computer includes a bus 201, a central processing unit (CPU) 202, a recording section, an input/output interface 206, a communicating section 207, an input section 208, a drive 209, an output section, and the like. Each of the structural elements is connected so as to be able to transmit information to each other via the bus 201, the input/output interface 206, and the like.

The program can be recorded on a hard disk drive (HDD) 203, a read only memory (ROM) 204, a random access memory (RAM) 205, or the like, which is an example of the recording section (the storage unit 180 may be included), for example.

Further, the program can be temporarily or permanently recorded on a removable recording medium 210, such as a flexible disc, an optical disc including various compact disc (CD), a magneto optical (MO) disc and a digital versatile disc (DVD) or the like, a magnetic disc, a semiconductor memory, or the like. Such removable recording medium 210 can be provided as so-called package software. In this case, the program recorded on the removable recording medium 210 may be read out by the drive 209 and recorded on the above-described recording section via the input/output interface 206, the bus 201, or the like.

Further, the program may be recorded on a download site, other computers, other recording devices or the like (not shown), for example. In this case, the program is transferred via the network 4, such as a local area network (LAN), the Internet or the like, and the communicating section 207 (the related information obtaining section 160 may be included) receives the program. The program received by the communicating section 207 may be recorded on the above-described recording section via the input/output interface 206, the bus 201, or the like.

With the CPU 202 executing various processes according to the program recorded on the above-described recording section, the above-described series of processes is realized. At this time, the CPU 202 may directly read out the program from the above-described recording section, or may execute the program after temporarily loading the program on the RAM 205, for example. Further, when receiving the program via the communicating section 207 or the drive 209, for example, the CPU 202 may directly execute the received program without recording the same on the recording section.

Further, the CPU 202 may perform various processes based on the signal or information input from the input section 208, such as the controller 5, a mouse, a keyboard, a microphone, or the like (not shown) as necessary.

The CPU 202 may output the result of executing the above-described series of processes from an output device, such as the display 150 such as a monitor, or the audio output section 211 such as a speaker or a headphone, or the like. Further, the CPU 202 may transmit the process result from the communicating section 207 as necessary, and record the same on the above-described recording section or the removable recording medium 210.

Note that, in the present specification, the steps described in the flow chart may be processed in time-series in the described order, but it is not necessary to be in time-series, and the steps may also be processed in parallel or individually. Further, it is needless to say that, even if the steps are to be processed in time-series, the order may be appropriately changed as necessary.

What is claimed is:

1. An information processing apparatus comprising:
a content display control section switching contents to be displayed on a display screen; and
a related information display control section displaying, during a switching period when a content displayed on the display screen is switched from one content to another content, related information related to the other content,
wherein the related information display control section fades out the related information displayed on the display screen at the time of displaying the other content on the display screen,
wherein the related information display control section displays on the display screen not only related information related to the other content, but also related information related to a subsequent content to be reproduced subsequent to the other content,
wherein the related information display control section further displays on the display screen a time interval from the end of reproduction of the other content until the subsequent content is reproduced, and wherein the related information display control section includes a display scale adjusting section adjusting, according to the time interval, display scale of at least either of related information related to the other content and related information related to the subsequent content.

2. The information processing apparatus according to claim 1, wherein the content display control section fades in the other content to display on the display screen.

3. The information processing apparatus according to claim 1, wherein the related information display control section provides a non-display period where no image is displayed on the display screen after the related information is faded out and before the other content is displayed.

4. An information processing apparatus comprising:

a content display control section switching contents to be displayed on a display screen; and a related information display control section displaying, during a switching period when a content displayed on the display screen is switched from one content to another content, related information related to the other content, wherein the related information display control section fades out the related information displayed on the display screen at the time of displaying the other content on the display screen, and wherein the related information display control section includes a display scale adjusting section adjusting, according to the related information, display scale of the related information on the display screen.

5. An information processing apparatus comprising:

a content display control section switching contents to be displayed on a display screen; and a related information display control section displaying, during a switching period when a content displayed on the display screen is switched from one content to another content, related information related to the other content, wherein the related information display control section fades out the related information displayed on the display screen at the time of displaying the other content on the display screen, wherein the information processing apparatus comprises a priority information storing section storing priority information indicating priority degree of a content to be displayed on the display screen, and wherein the related information display control section includes a display scale adjusting section adjusting, according to the priority information, display scale of the related information on the display screen.

6. The information processing apparatus according to claim 5, wherein the related information display control section further includes a priority information generating section generating the priority information based on related information of a content already displayed on the display screen.

7. An information processing apparatus comprising:

a content display control section switching contents to be displayed on a display screen; and a related information display control section displaying, during a switching period when a content displayed on the display screen is switched from one content to another content, related information related to the other content, wherein the related information display control section fades out the related information displayed on the display screen at the time of displaying the other content on the display screen, wherein the related information includes attribute information of the other content, and wherein the information processing apparatus further comprises an image adding section adding, according to the attribute information, a predetermined image to related information to be displayed on the display screen.

8. An information processing method comprising the steps of:

switching contents to be displayed on a display screen;

displaying, during a switching period when a content displayed on the display screen is switched from one content to another content, related information related to the other content, and fading out the related information displayed on the display screen at the time of displaying the other content on the display screen, and further comprising:

displaying on the display screen not only related information related to the other content, but also related information related to a subsequent content to be reproduced subsequent to the other content;

displaying on the display screen a time interval from the end of reproduction of the other content until the subsequent content is reproduced; and adjusting, according to the time interval, display scale of at least either of related information related to the other content and related information related to the subsequent content.

9. A non-transitory computer-readable memory having stored thereon a program causing a computer to realize:

a content switching function of switching contents to be displayed on a display screen;

a related information displaying function of displaying, during a switching period when a content displayed on the display screen is switched from one content to another content, related information related to the other content; and a display state changing function of fading out the related information displayed on the display screen at the time of displaying the other content on the display screen, wherein the related information displaying function causes displaying on the display screen of not only related information related to the other content, but also related information related to a subsequent content to be reproduced subsequent to the other content, wherein the related information displaying function further causes displaying on the display screen a time interval from the end of reproduction of the other content until the subsequent content is reproduced, and wherein the related information displaying function includes a display scale adjusting function of adjusting, according to the time interval, display scale of at least either of related information related to the other content and related information related to the subsequent content.

* * * * *